Feb. 13, 1968 J. T. FRYDRYK 3,368,438
AUTOMATIC VARIABLE LENGTH WEB CUTTING MACHINE
Filed May 23, 1966 5 Sheets-Sheet 1
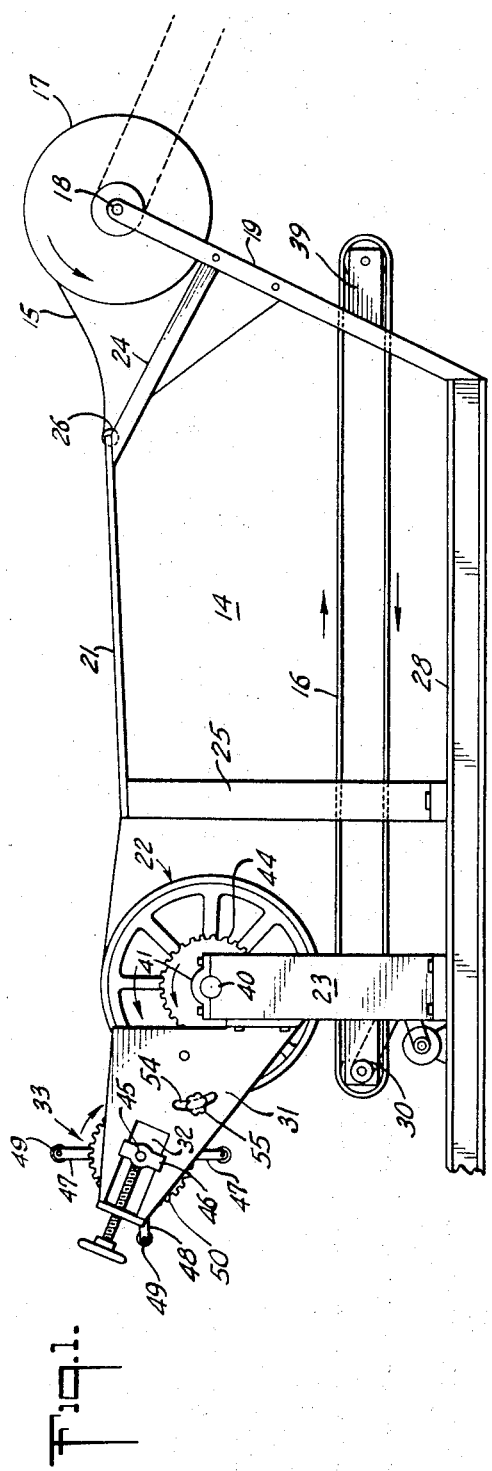
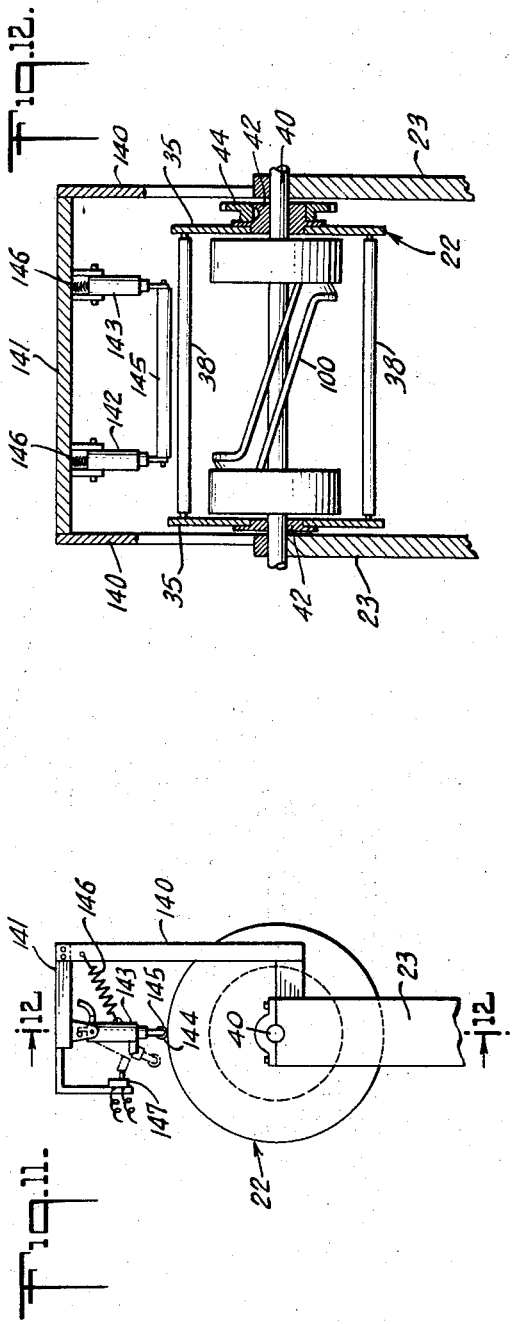
INVENTOR
JOHN T. FRYDRYK
BY
ATTORNEY

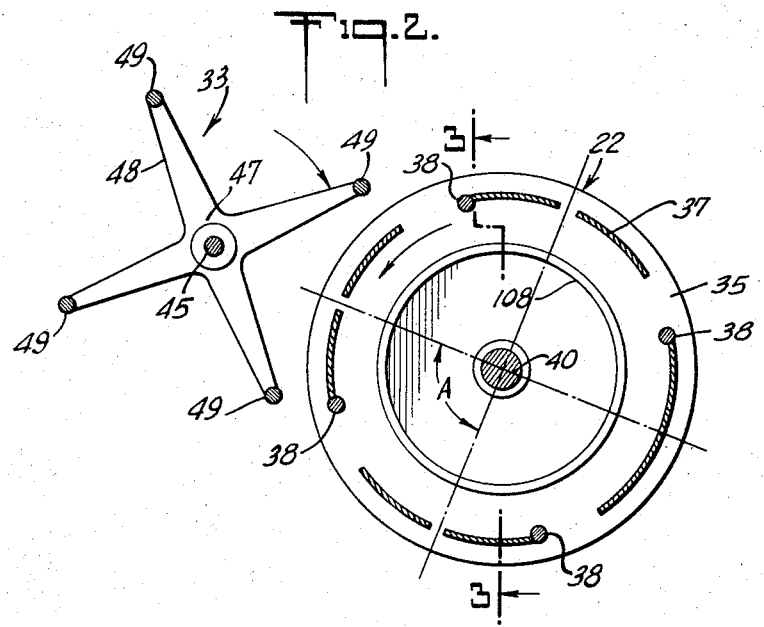
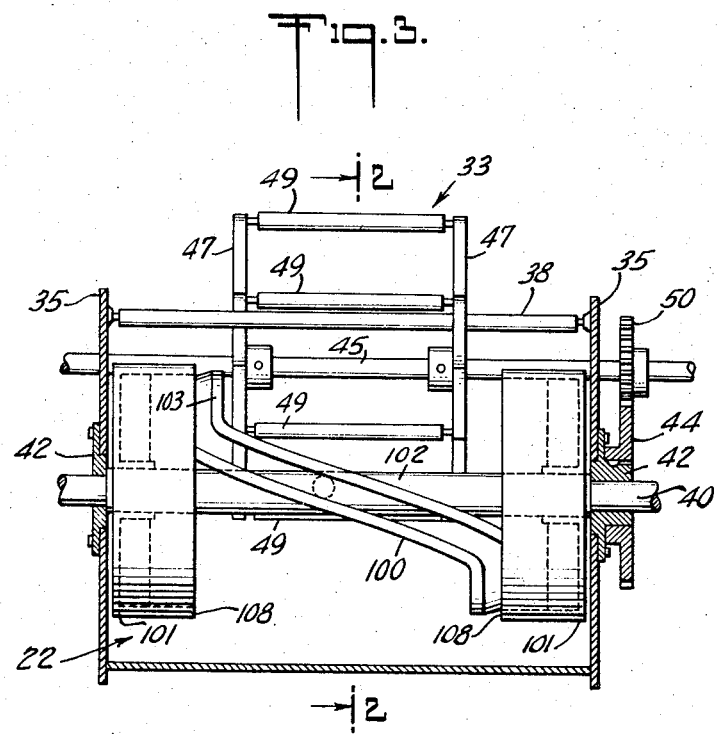

INVENTOR
JOHN T. FRYDRYK
BY
ATTORNEY

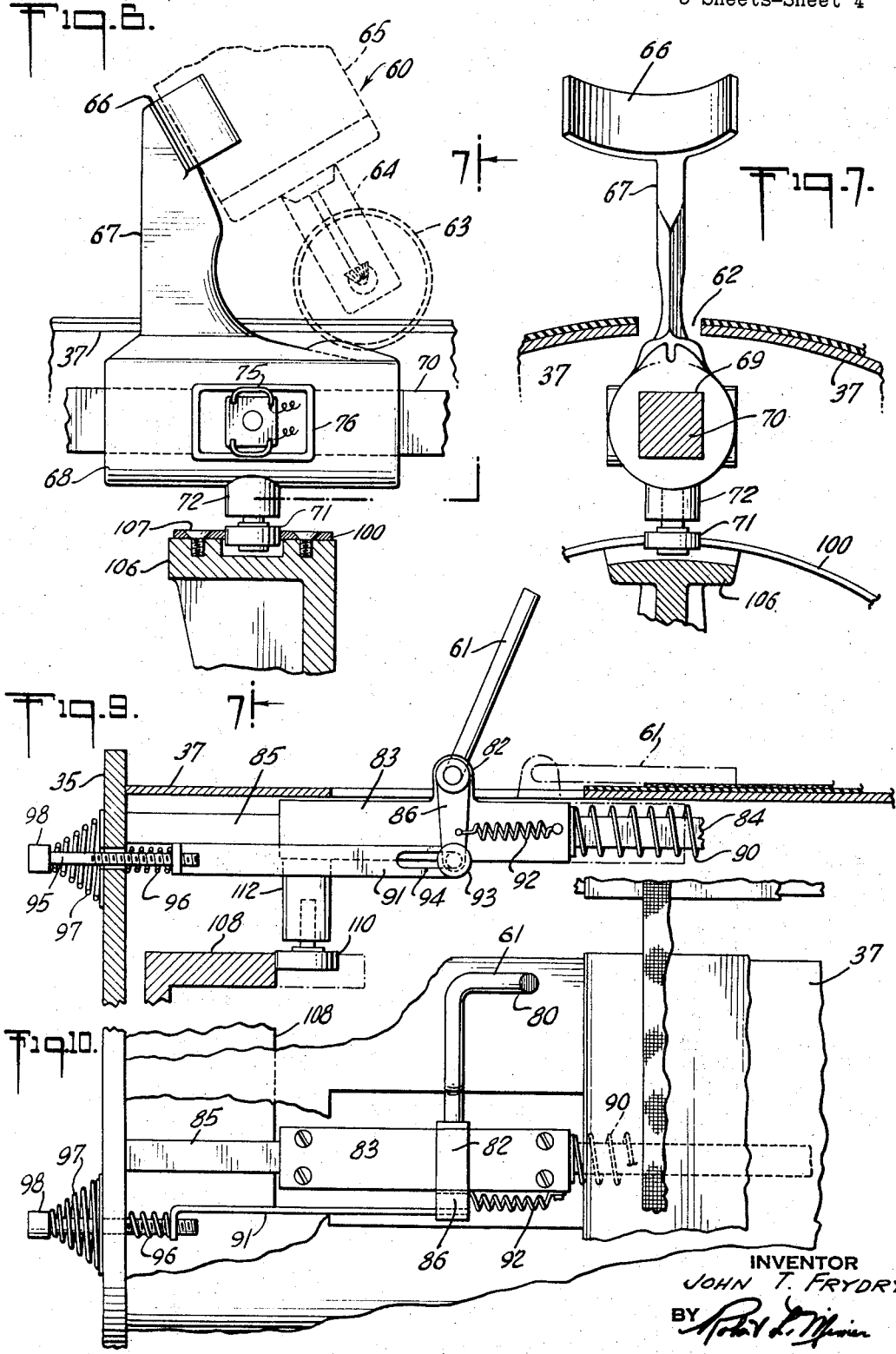

Feb. 13, 1968    J. T. FRYDRYK    3,368,438
AUTOMATIC VARIABLE LENGTH WEB CUTTING MACHINE
Filed May 23, 1966    5 Sheets-Sheet 5
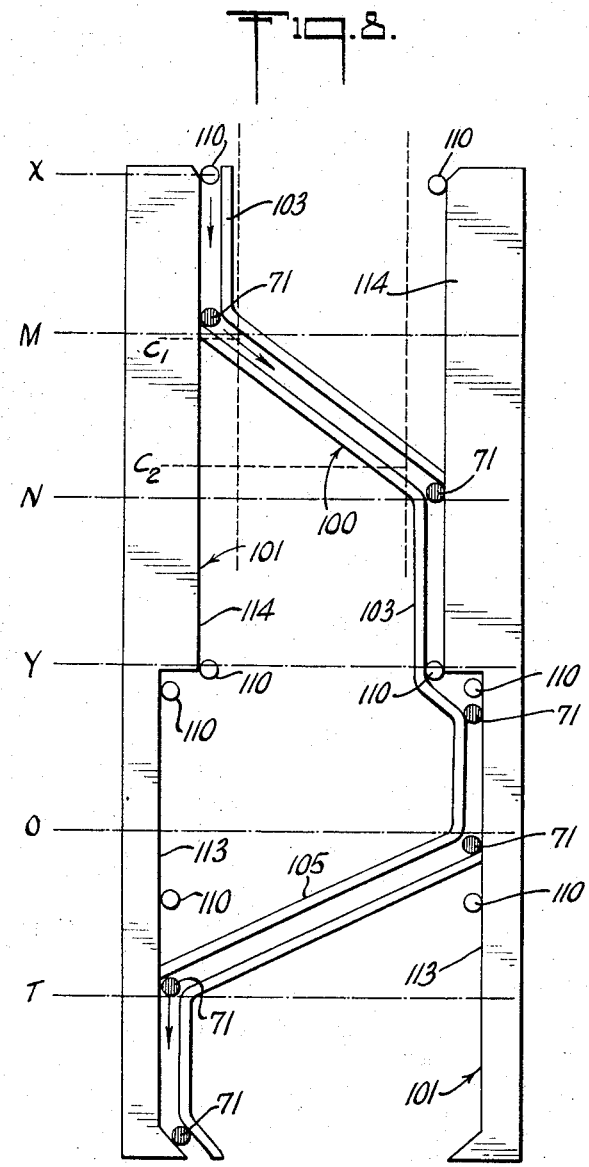
INVENTOR
JOHN T. FRYDRYK
BY
ATTORNEY

United States Patent Office 3,368,438
Patented Feb. 13, 1968

3,368,438
AUTOMATIC VARIABLE LENGTH
WEB CUTTING MACHINE
John T. Frydryk, Springfield, Mass., assignor to Johnson
& Johnson, a corporation of New Jersey
Filed May 23, 1966, Ser. No. 552,060
5 Claims. (Cl. 83—336)

The present invention relates to an automatic machine for cutting pieces of sheet material from a strip of material and being able to control and vary the length of the individual pieces of material which are cut.

In my earlier issued U.S. Patent No. 3,149,517, issued Sept. 22, 1964, there is shown an automatic machine which, among other things, cuts a plurality of individual pieces of sheet material from a strip of material. In this machine the material to be cut is wrapped about the circumference of a drum, slitters are mounted on this drum at the desired spacing. The material is wrapped about a portion of the drum, clamped in place and then cut. In such a machine the length of the material that is cut will be controlled by the circumference of the drum and the spacing of the slitters. In order to vary the length of the material cut in such a mechanism, it means rebuilding the entire drum to either increase or decrease the circumference or increase or decrease the spacing between slitters.

In the manufacture of many articles, such as diapers, crib sheets, and other items from standard textile fabrics, it is desirable to be able to manufacture various sizes, for example, in the manufacture of diapers it may be desirable to have a machine capable of manufacturing small, medium and large size diapers, that is, diapers of varying length rather than being limited to one size.

In the machine shown in my U.S. Patent No. 3,149,517, it is a relatively simple operation to change the width of the individual pieces of material produced. This may be done by building the machine wide enough and merely changing the width of the material fed to the machine, or if it is to be folded as it is fed, changing the desired fold. However, this prior machine has a limitation in that the variation of the length of individual pieces that the machine produces is limited.

In accordance with the present invention, there is provided an automatic machine for accurately cutting pieces of sheet material of a definite size from a continuously moving strip which allows this definite size to be varied as desired so that the machine may be used to produce pieces of different lengths.

The present invention will be more fully described and understood from the following description and claims taken together with the drawings, wherein:

FIGURE 1 is a partially cut away side elevational view of one embodiment of the machine according to the present invention;

FIGURE 2 is an enlarged sectional view looking into the end of the cutting drum and tucking mechanism of FIGURE 1 and taken along the line 2—2 of FIGURE 3;

FIGURE 3 is a view partly in section and partly in elevation along the line 3—3 of FIGURE 2;

FIGURE 6 is a view partly in section and partly in elevation of one of the cutting units associated with the cutting drum of the preceding figures;

FIGURE 7 is an end view of one of the cutting units of FIGURE 6 partly in section and partly in elevation and taken along line 7—7 of FIGURE 6;

FIGURE 8 is a schematic developed view of the drum cam and the drum cutter track;

FIGURE 9 is a view partly in section and partly in elevation taken lengthwise of the cutting drum along the line 9—9 of FIGURE 10 to show a portion of the drum and the operation of one of the drum clamp units looking at the side of the unit;

FIGURE 10 is a view similar to that of FIGURE 9 looking at the top of the drum clamp unit;

FIGURE 11 is an elevational view of the cutting drum and a modification of the tucking mechanism according to the present invention; and FIGURE 12 is a view partly in section and partly in elevation taken along line 12—12 of FIGURE 11.

Figure 4:
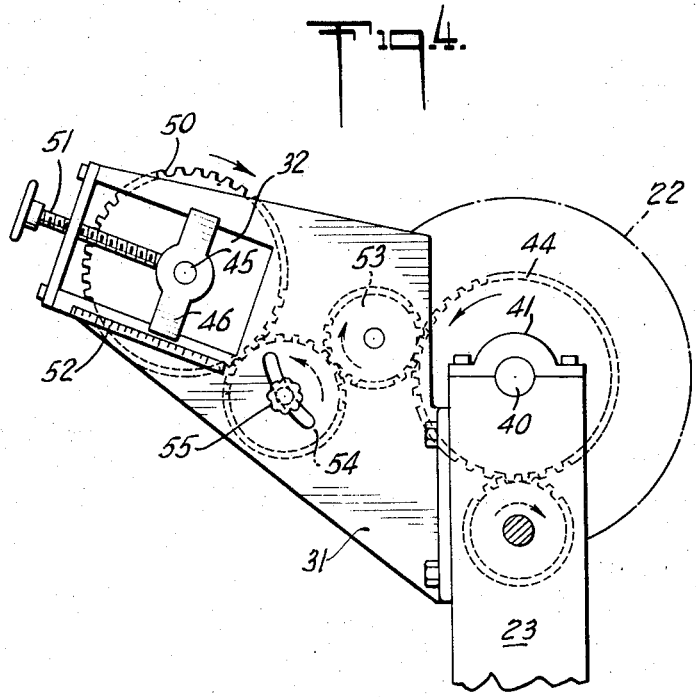
FIGURE 4 is an elevational view of the frame holding the cutting drum and tucking mechanism along with the various gears for driving the cutting drum and tucking mechanism.

Referring to FIGURE 1 of the drawings, there is shown an automatic machine 14 for cutting sheet material 15 into individual blanks. The blanks are cut from a continuous strip of sheet material moving in a given linear path at a constant speed, after which they are deposited on a conveyor 16 in flat form for transportation through various other operations.

The strip of sheet material is unwound from a supply roll 17 mounted for rotation on an axle 18 journaled in the upper ends of inclined uprights 19 extending from the base at the rear end of the machine. The supply roll is driven by means of a motor (not shown) at constant rate of speed depending upon the speed at which the individual blanks are to be produced and the size of the individual blanks. The material is fed from the supply roll onto an overhead track 21 to a cutting drum 22 mounted on vertical posts 23 adjcent the front end of the machine. The track is supported by extensions 24 on the inclined uprights at the rear end of the machine and by vertical uprights 25 near the cutting drum. A guide roller 26 is provided in the rear end of the overhead track to aid in the feeding of the material along the track.

The machine is supported on a pair of spaced longitudinal floor girders 28, one of which is not shown in FIGURE 1. A conveyor 16 is mounted from suitable braces 29 and 30 extending from the inclined uprights at the rear end of the machine and from the vertical posts adjacent the front end of the machine respectively. Also mounted from the vertical posts 23 by suitable framing 31 having slots 32 at the front end thereof is a tucking mechanism 33 operating in conjunction with the cutting drum. The tucking mechanism is mounted for rotation in the slots.

The strip of sheet material is clamped to the cutting drum and pulled around the drum. During the time it moves with the drum, the strip is cut into blanks by cutters shown in FIGURES 6 and 7, but not in FIGURE 1, associated with the drum. Each of the blanks is then deposited on the conveyor passing beneath the drum. The surface of the drum and the conveyor both move in the same direction and the conveyor may move at the same linear speed as the speed of the supply roll or the same linear speed as the speed of the cutting drum so that the transfer is accomplished without interfering with the motion.

As shown in FIGURES 2 and 3 of the drawings, the cutting drum 22 comprises a pair of end plates 35 or disks secured to the opposite ends of a metal cylinder 36. This cylinder consists of eight segments 37. Each segment actually covers slightly less than 45 degrees of the surface of the cylinder. These segments define eight slots. At every other segment there is a rotatable roll 38. The slots adjacent the rolls are used to accept the tucking mechanism as will be hereinafter described. The remaining four slots are cutter slots. One of these cutter slots is shown in detail in FIGURE 5. The drum is mounted for rotation upon a fixed axle 40 which in turn is mounted on top of the aforesaid vertical posts 23 by a clamping device 41 which fits around the axle and is bolted to the post. Each of the end plates is secured to a bushing 42 mounted for rotation on the fixed axle. A drive gear 44 integral with one end of the bushings is provided for driving the drum. The drive gear meshes with a suitable drive mechanism, such as will be described hereinafter for rotating the drum and its associated parts on the axle.

Mounted from frames 31 extending from the vertical posts 23 is the tucking mechanism 33. The tucking mechanism comprises a shaft 45 mounted for rotation in bearings 46 which are adjustably mounted in the slots 32 in the frames. Mounted on the shaft 45 at a spaced-apart distance are two disks 47 having four arms 48 each. The arms extend out from the shaft at every 90 degree angle about the circumference of the shaft. At the ends of the arms of these disks and extending between disks are rotatable rolls 49. At the end of the shaft 45 and in line with the drive gear on the cutting drum is a drive gear 50 which is driven by the cutting drum drive gear through a series of gears as will be hereinafter described.

The tucking mechanism nd cutting drum rotate in opposite directions as shown by the arrows in the drawings. The cutting drum rotates in a counterclockwise direction while the tucking mechanism rotates in a clockwise direction.

As more clearly shown in FIGURE 4, the shaft 45 of the tucking mechanism is mounted in a bushing 46 which is slidably mounted in the slot in the frame ends. The bushing extends over the sides of the frame and the hand screw 51 adjusts the position of the bushing in this slot in the frame. Along the side of the frame is a calibrated bar 52 to adjust the amount of tucking desired. The tucking mechanism is driven by the drive gear 44 of the cutting drum through two intermediate gears 53 and 54. One intermediate gear 54 is adjustable by means of the hand adjustment 55 so that if the tucking mechanism is desired to be further removed from the cutting drum, it may be so moved and the drive gears engaged by adjusting the intermediate gear 54.

In operation the cloth is brought about the cutting drum as the drum rotates, the tucking mechanism rotating in the opposite direction is positioned so that the rolls at the ends of the arms of the tucking mechanism enter into the slot between the roll of the cutting drum and its adjacent section thereby tucking the material into this slot. By adjusting the spacing between the tucking mechanism and the cutting drum, you adjust the depth to which the roll extends into the slot on the cutting drum, and hence the length of the tuck, allowing for various length blanks to be cut.

Figure 5:
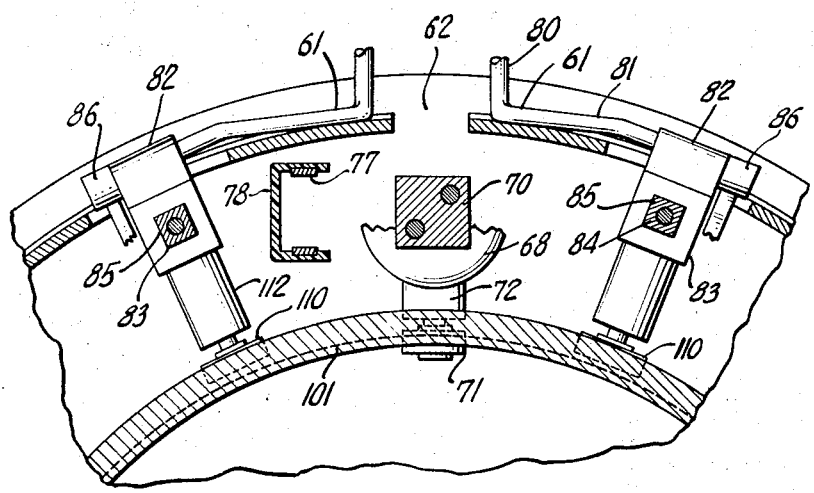
FIGURE 5 is a view partly in section and partly in elevation showing one of the transverse slots extending across the drum and the relationship of the cutter shaft, the clamp shaft, and the drum clamps to this slot.

As more clearly shown in FIGURES 5 to 7, a traveling cutter 60 and four drum clamps 61 are associated with each of the cutter slots 62 and of course rotate with the slots and the drum. There is a pair of cutter clamps for each slot at each end of the drum, one clamp on each side of the slot. To avoid unnecessary duplication, only the clamps for one slot at one end of the drum are shown and described, since they are duplicated at each end of these slots.

Each of the cutters is in the form of an electrically driven circular knife 63 mounted for rotation in a cutter unit which in turn is adapted for axial movement on the drum while it rotates therewith. Each cutter is mounted at the end of an arm 64 extending from an electric motor 65. The motor is mounted in a cradle 66 integral with the top of a vertical standard 67 extending upwardly from a hollow cutter sleeve 68. The sleeve defines a square opening 69 which extends through the sleeve lengthwise thereof. Each of the cutter units is mounted for motion axially in the drum on a square shaft 70 which fits into the square longitudinal opening in the sleeve and is secured at each of its ends to one of the drum disks by suitable means. Since the square opening in the cutter sleeve fits the square shaft of the cutter unit, it is keyed to the shaft for motion with respect thereto only in the direction of the length of the shaft. Each of the cutter shafts is positioned radially below or inwardly of its corresponding cutter slot so that the cutter sleeves travel across the drum just inside the drum cylinder segments.

As shown most clearly in FIGURE 7 the vertical standard is necked down in width somewhat where it passes through the slots so as to minimize the width of the slot. A cam follower roller 71 for moving the cutter unit transversely of the drum is secured in a boss 72 at the bottom of each of the cutter sleeves. The cutter unit during each turn of the drum first passes from one side of the drum to the other in its corresponding cutter slot to cut through the material and then returns to the first side of the drum and remains there until another cut is initiated. As will be explained more fully hereinafter, the motion of the cutting unit across the drum occurs during a relatively small segment of the drum's rotation, say 60 degrees, and the cutting and return motions of the cutter unit preferably are spaced about 180 degrees from one another, thus the cutter itself need only be turning in the cutter arm during a small portion of the travel of the drum. If desired, intermittent cutter operation is achieved by supplying power intermittently to the cutter motor. The cutter motor is connected to brushes 75 mounted in an insulated arm 76 bolted to one side of the cutter sleeve. The brushes in turn ride in contact with bus bars 77, which extend the length of the slot and are secured in opposite legs of the C-shaped track 78, attached at its ends to the drum disks. The bus bars are connected through insulating inserts to a suitable power source (not shown) outside the drum disks.

As shown in FIGURES 5, 9 and 10, the cutter clamps 61 each in the form of an arm may be shaped from a piece of heavy metal wire or the like. The wire is bent 90 degrees to provide a straight arm portion 80 and a rear portion 81 so that it may be mounted at its rear end in such a way that its tip may be pressed down upon or lifted off a portion of one of the blanks merely by rotating its rear axle portion. The axle portion is mounted for rotation in a boss 82 extending upwardly from a clamp sleeve 83. The clamp sleeve like the cutter sleeve contains a square opening 84 extending lengthwise of the sleeve and is fitted over a square clamp shaft 85 for axial movement along the shaft. Again the clamp shaft fits in the square opening in the clamp sleeve in such a way as to prevent motion of the sleeve with respect to the shaft in any direction except longitudinally of the shaft. Two pair of clamps, only one of which is shown in the drawings, are mounted on their respective sleeves for slidable movement along each of the clamp shafts. The sleeves on each of the clamp shafts are held apart and urged toward the disks at the end of the drum by suitable means, such as a compression spring 90 pressing against the inner face of each of the sleeves.

The end of the axle portion of each of the clamps after it passes through the boss is fixed to a control arm 86 which in turn is slidably connected to a link 91 resiliently mounted in the adjacent drum disk. Movement of the end of the control arm causes the axle portion of the clamp to rotate in the boss to raise or lower the arm portion of the clamp. The end of the control arm is urged inwardly of the sleeve by a tension spring 92 connecting the control arm to the inner end of the sleeve, thus the outer end of the arm portion of the clamp normally is held upwardly.

The control arm terminates in a device 93 which is adapted to ride in a slot 94 extending longitudinally of the link. The link is in turn spring-mounted but in a relatively fixed position in a disk on a mounting bolt 95 secured into the end of the link. Compression springs 96 and 97 between the link and the disk and the disk and a collar 98 at the outer end of the mounting bolt respectively provide a resilient mounting for the link. If the clamp sleeve is caused to move inwardly of the disk away from the position shown, the end of the control arm will be held by the link. Further inward motion of the sleeve can only occur if the control arm rotates upwardly about the axle portion of the clamp thereby causing the end of the arm portion to move downwardly.

As shown in FIGURES 2, 3 and 5 through 10, the cutter track 100 and a pair of identical but oppositely facing drum cams 101 are mounted on a sleeve 102 secured to the fixed shaft inside of the drum. The cutter track is made of a track guide or strip 103 on one side of the track and one of the drum cams on the other side of the track, except in the inclined sections 104 and 105 where the track crosses the drum. The inclined section 104 guides the cutter during the cutting stroke and the section 105 returns the cutter to the first side of the drum. The sections are made up of a pair of spaced strips which are mounted on supporting arms which are fixed to the sleeve. The upper ends of each of the supporting arms terminate in a spacer plate 106 which holds the spaced strips which make up the track. The strips may be mounted similarly where they cooperate with the drum cams to form the track. The strips are secured to the spacer plate by means of screws 107 or the like.

Each of the drum cams 101 is in the form of a pair of flanged circular plates 108 fixed to opposite ends of the sleeve on the axle just inside of the drum disks. Each of the oppositely facing drum cams operates the clamps at one end of the drum and controls the cutting units when they are at that end of the drum. The operation of the drum clamps will be described in connection with the drum cam at only one end of the drum since the halves operate in the same way at each end of the drum.

Each of the drum cams is in the form of an annular flange which extends axially inwardly from one of the plates at one end of the drum. The operation of the cam is determined by its shape in the direction axially of the drum or its axial height. The shape of the cams is converted to motion of the drum clamp sleeves through a roller follower 110 in contact with the cam and mounted to rotate in a foot 112 extending downwardly from the outer end of each of the sleeves. Considering the operation of the units at one end of one of the cutter slots as the drum rotates, the clamp cam follower for the clamp leading the slots and which has been riding along a depressed portion 113 of the drum cam reaches a rise 114 in the cam which causes the clamp unit to move inwardly along its shaft and operate to clamp the strip extending around the drum. Next, the drum clamp immediately following the slot operates on the drum cam in the same way as the first clamp so that the clamps on each side of the slot are holding the stripped material. Then after the clamps at both ends of the slot have moved into clamping position, the cutter follower which also has been riding along the drum cam radially inwardly of the path of the clamp followers enters at one end of the inclined track section and begins its movement across the drum. The clamps at each end of the slot remain in clamping position after the cutter has completed its travels until it is time to position a blank on the conveyor passing under the drum.

As shown in FIGURE 5, the drum cam and the track or strips are concentric and positioned so as to be radially overlapping. However, the drum cam is considerably thicker than the stripper strips, and the strips are positioned radially at the inner edge of the cam. The cutter followers are positioned radially at the level of the strips and inwardly of the drum clamp cam followers and ride in the track formed by the cam and the adjacent strip or between the two strips where the track traverses the drum. The clamp cam followers are positioned radially at the level of the upper half of the drum cam and radially outwardly of the followers so as to clear the strips, thus the drum clamp cam followers and the respective clamps are free to move axially of the drum independently of the cutter track.

Each of the cylinder segments of the drum may be covered with a roughened layer of material such as a sponge rubber sheet 120 so as to present a relatively rough resilient surface between the slots. The resilient layer facilitates clamping the continuous strip of material and the blanks on the drum and due to its roughened surface also tends to prevent material from slipping on the drum.

As shown in FIGURE 8 the rise in the drum cams is positioned so that each of the drum clamps is moved to its clamping position just after the clamp passes the vertical center line of the drum at the top of the drum as shown in FIGURE 3. This position is designated X.

The drum clamps remain in their clamping position until just after the clamps pass the vertical center line of the drum at the bottom of the drum or at Y.

Thus, that portion of the rotation of the drum during which the clamps hold the strips or the blanks on the drum may be represented by the area or distance between X and Y.

Referring again to FIGURES 2 and 8, the cutter follower begins its traverse across the drum at the point M in the rotation of the drum surface and continues through the arc MN during rotation of the drum through the angle A.

As shown in FIGURE 8, the cutter enters one edge of the strip at the point $C_1$ in the rotation of the drum. Cutting continues til the point $C_2$ in the rotation of the drum is reached and the cutter leaves the strip. At point $C_2$ a new blank is completely severed from the strip. It should be noted that before the blank is completely cut from the strip, the clamps leave the next slot and have moved into clamping position so that there are always at least two pairs of clamps pulling the strip around the drum. Following the point N in the rotation of the drum, the cutter follower follows the drum cam at that end of the drum til it reaches the point O in the rotation of the drum surface when it begins its return traverse to its starting position at the other end of the drum. This traverse is completed at point T in the rotation of the drum.

In operation, the strip material is placed on the drum. The material is gripped by the leading clamp of the pair on a slot and then by the trailing clamp of the pair on the slot. The cutter is activated and moved transversely across the drum cutting the material while the drum is rotating. As the drum rotates the tucking mechanism rotates to engage a slot on the drum tucking the material in this slot to form the desired length blank. The leading clamps of the next slot are then activated clamping the material as are the trailing clamps of that slot and the next cutter activated to sever the material transversely. The clamps on the front end of the material are released as the drum meets its mid-point at the bottom. By the time the trailing edge of the blank is cut, it has also reached the bottom of the drum and the leading clamps of the next slot are released dropping the blank onto the conveyor passing beneath. This operation continues depositing the desired length blanks on the conveyor.

In some instances it may be desirable to vary the length of individual pieces of material cut from the same supply roll. Very often fabrics are woven with different widthwise panels so that when pieces are cut, they will contain certain proportions of these different panels, e.g., a shaped diaper may have differently woven panels, that is two relatively nonshrinking panels at each end of the diaper and a high shrinking panel in the center of the diaper. In cutting such blanks from a roll of material very often the panels will get out of registry and the machine of the present invention may be used to control this registry.

In the embodiment shown in FIGURES 11 and 12 there is shown a modification of the machine of the present invention for varying the length of pieces of material cut from a supply roll and which may also be used to control the registry of various widthwise panels as described above. The machine is similar to that described in conjunction with FIGURES 1 through 10; however, the tucking mechanism is replaced with the tucking mechanism shown in FIGURES 11 and 12.

Referring to FIGURES 11 and 12, there are a pair of posts 140 extending upwardly from the vertical posts 23 which support the cutting drum 22. At the top of these posts and extending between these posts and cantilevered outwardly to extend over the vertical midpoint of the cutting drum is a brace 141. Pivotally mounted from this brace are a pair of spaced-apart pneumatic cylinders 142 and 143 connected to a suitable air source. The cylinders are mounted downwardly from the brace, and at the bottom and between the cylinders from suitable brackets 144 there is mounted a rotatable roll 145. The cylinders are held in the vertical position by the springs 146 extending from the cylinders back to the brace 141. Extending outwardly and downwardly from the brace 141 in front of one of the cylinders is a micro-switch 147 which functions as hereinafter described.

The pneumatic cylinders may be activated manually by a timing device or by a sensing device placed prior to the material contacting the drum. If there are different weave panels in the material to be cut, a vacuum or electric sensing device may be placed in the chute feeding the material and used to actuate the cylinders.

In operation the cylinders are actuated and the roll 145 depressed as a tucking slot in the cutting drum passes beneath the cylinders. The roll 145 pushes material into the slot and the roll is pushed forwardly by the cutting drum until the micro-switch 147 is contacted deactivating the cylinders 142 and 143 allowing the roll to rise and allowing the springs 146 to bring the roll back to the vertical position for subsequent operation. Usually in practice the tucking mechanism is only activated by the sensing device if the differently woven panels are out of registery.

The operation of the various parts of the machines of this invention may be timed with respect to one another by various conventional devices and techniques. For instance, driving mechanisms wherein all the parts are driven from the single motor through a main shaft and by a series of pulleys and belts on various intermediate shafts. The size and arrangement of pulleys and gears are designed to provide the desired speed relationships between the various parts. Where regulation is desirable, speed regulators may be provided.

Having now described the invention in specific detail and exemplified the manner in which it may be carried into practice, it will be readily apparent to those skilled in the art that innumerable variations, modifications, applications and extensions of the basic principles involved may be made without departing from its spirit and scope.

What is claimed is:

1. An automatic machine for cutting pieces of sheet material from continuous strips and readily adjustable so as to cut pieces of varying length which comprises: a rotatable cutting cylinder carrying at least one cutter movable axially of the cylinder and adapted to cut through a strip of material passing circumferentially around the cylinder from edge to edge of the strip to sever successive pieces of material from the strip as the cylinder rotates, front and rear clamping means clamping front and rear portions respectively of each of the pieces of material to the cylinder during and after the aforesaid cutting operation, a tucking mechanism for engaging the circumference of the cutting cylinder as it rotates to push material on the surface of said cylinder into a slot in the cylinder after the front clamping means have engaged the front edge portions of the material and before the rear clamping means have engaged the rear edge portions of the material and means responsive to the relative rotative position of the cylinder for actuating said clamping means to release the front end of each piece of material when the front edge of the piece passes under the midpoint of the bottom of said cylinder and for actuating said rear clamping means holding the same piece of material to release the rear end of said piece when the rear end of this piece of material reaches the midpoint of the bottom of said cylinder.

2. An automatic machine according to claim 1 wherein the tucking mechanism comprises a rotatable roll movable in a circular path which intersects with the circumference of the rotatable cutting cylinder after the front clamping means have engaged the material and before the rear clamping means engage said material.

3. An automatic machine according to claim 1 wherein the tucking mechanism comprises a rotatable roll movable in a substantially triangular path which intersects with the circumference of the rotatable cutting cylinder after the front clamping means have engaged the material and before the rear clamping means engage said material.

4. An automatic machine for cutting pieces of the sheet material from a continuous strip and being adjustable to cut various lengths of such material which comprises: a rotatable cutting cylinder carrying a plurality of cutters movable axially of the cylinder and adapted to cut through a strip of material passing circumferentially around the cylinder from edge to edge of the strip to severe successive pieces of material from the strip as the cylinder rotates, front and rear clamping means clamping front and rear edge portions respectively of each of the pieces of material to the cylinder during and after the aforesaid cutting operation, a plurality of tucking means spaced from said cylinder and movable in a path to pass into a slot in said cylinder to push material into said slot and control the length of the pieces cut, said tucking means engaging said cylinder after the front edge portions have been clamped and before the rear edge portions have been clamped, means responsive to the relative rotative position of the cylinder for actuating said front clamping means to release the front end of each piece approximately when the front edge of the piece passes under the midpoint of the bottom of said cylinder, and for actuating said rear clamping means holding the same piece of material to release the rear end of said piece when the rear end of this piece of material reaches the midpoint of the bottom of said cylinder.

5. An automatic machine according to claim 4 wherein the tucking means comprises a plurality of rotatable rolls moving in a circular path which path intersects with the circumference of the rotatable cutting cylinder, each of said rolls intersecting with said cylinder after the front edge portions of the material have been clamped and before the rear edge portions of said material are clamped.

References Cited

UNITED STATES PATENTS

| | | | |
|---|---|---|---|
| 658,474 | 9/1900 | Sparks | 83—338 X |
| 1,486,306 | 3/1924 | Schultz | 83—336 X |
| 1,539,128 | 5/1925 | Loeb | 83—338 |
| 1,660,950 | 2/1928 | Zimniewicz | 83—336 |
| 3,149,517 | 9/1964 | Frydryk | 83—338 X |

WILLIAM W. DYER, JR., *Primary Examiner.*

F. T. YOST, *Assistant Examiner.*